United States Patent
Fish

(10) Patent No.: US 6,337,678 B1
(45) Date of Patent: Jan. 8, 2002

(54) FORCE FEEDBACK COMPUTER INPUT AND OUTPUT DEVICE WITH COORDINATED HAPTIC ELEMENTS

(75) Inventor: Daniel E. Fish, San Francisco, CA (US)

(73) Assignee: Tactiva Incorporated, San Francisco, CA (US)

( * ) Notice: Subject to any disclaimer, the term of this patent is extended or adjusted under 35 U.S.C. 154(b) by 0 days.

(21) Appl. No.: 09/357,727

(22) Filed: Jul. 21, 1999

(51) Int. Cl.[7] ............................................. G09G 5/00
(52) U.S. Cl. ................................. 345/156; 345/173
(58) Field of Search ............................ 345/161, 156, 345/157, 158, 173–179, 163

(56) References Cited

U.S. PATENT DOCUMENTS

| | | | |
|---|---|---|---|
| 4,202,041 A | 5/1980 | Kaplow et al. | 364/900 |
| 4,293,734 A | 10/1981 | Pepper, Jr. | 178/18 |
| 4,385,366 A | 5/1983 | Housey, Jr. | 364/900 |
| 4,448,837 A | 5/1984 | Ikeda et al. | 428/215 |
| 4,529,959 A | 7/1985 | Ito et al. | 338/295 |
| 4,914,624 A | 4/1990 | Dunthorn | 364/900 |
| 4,916,740 A | 4/1990 | Noda et al. | 382/59 |
| 5,159,159 A | 10/1992 | Asher | 178/18 |

(List continued on next page.)

OTHER PUBLICATIONS

Salisbury et al. "Haptic rendering programing Touch interaction with virtual objects," Symposium on Interactive 3D Techniques, Monterey, CA, Apr. 1995.*

Affidavit of Daniel E. Fish Under 37 C.F.R. § 1.56 (dated Nov. 29, 1999).

Bier, Eric A., Stone, Maureen C., Fishkin, Ken, Buxton, William, Baudel, Thomas, "A Taxonomy of See–Through Tools" (1994) (pp. 517–523). CHI94–4/94 Boston, MA.

(List continued on next page.)

*Primary Examiner*—Almis R. Jankus
*Assistant Examiner*—Amr Awad
(74) *Attorney, Agent, or Firm*—Skjerven Morrill MacPherson LLP; Samuel G. Campbell, III

(57) ABSTRACT

A set of haptic elements (haptels) are arranged in a grid. Each haptel is a haptic feedback device with linear motion and a touchable surface substantially perpendicular to the direction of motion. In a preferred embodiment, each haptel has a position sensor which measures the vertical position of the surface within its range of travel, a linear actuator which provides a controllable vertical bi-directional feedback force, and a touch location sensor on the touchable surface. All haptels have their sensors and effectors interfaced to a control processor. The touch location sensor readings are processed and sent to a computer, which returns the type of haptic response to use for each touch in progress. The control processor reads the position sensors, derives velocity, acceleration, net force and applied force measurements, and computes the desired force response for each haptel. The haptels are coordinated such that force feedback for a single touch is distributed across all haptels involved. This enables the feel of the haptic response to be independent of where touch is located and how many haptels are involved in the touch. As a touch moves across the device, haptels are added and removed from the coordination set such that the user experiences an uninterrupted haptic effect. Because the touch surface is comprised of a multiple haptels, the device can provide multiple simultaneous interactions, limited only by the size of the surface and the number of haptels. The size of the haptels determines the minimum distance between independent touches on the surface, but otherwise does not affect the properties of the device. Thus, the device is a pointing device for graphical user interfaces which provides dynamic haptic feedback under application control for multiple simultaneous interactions.

12 Claims, 9 Drawing Sheets

U.S. PATENT DOCUMENTS

| | | | |
|---|---|---|---|
| 5,165,897 A | 11/1992 | Johnson | 434/113 |
| 5,222,895 A | 6/1993 | Fricke | 434/113 |
| 5,241,308 A | 8/1993 | Young | 341/34 |
| 5,412,189 A | 5/1995 | Cragun | 235/379 |
| 5,442,788 A | 8/1995 | Bier | 395/650 |
| 5,479,528 A | 12/1995 | Speeter | 382/115 |
| 5,518,078 A | 5/1996 | Tsujioka et al. | 178/18 |
| 5,576,727 A | 11/1996 | Rosenberg et al. | 345/179 |
| 5,581,670 A | 12/1996 | Bier et al. | 395/326 |
| 5,583,478 A | 12/1996 | Renzi | 340/407.1 |
| 5,587,937 A | 12/1996 | Massie et al. | 364/578 |
| 5,617,114 A | 4/1997 | Bier et al. | 345/113 |
| 5,623,582 A | 4/1997 | Rosenberg | 395/99 |
| 5,625,576 A | 4/1997 | Massie et al. | 364/578 |
| 5,633,660 A | 5/1997 | Hansen et al. | 345/173 |
| 5,643,087 A | 7/1997 | Marcus et al. | 463/38 |
| 5,691,748 A | 11/1997 | Fukuzaki | 345/173 |
| 5,691,898 A | 11/1997 | Rosenberg et al. | 364/190 |
| 5,694,013 A | 12/1997 | Stewart et al. | 318/561 |
| 5,694,150 A | 12/1997 | Sigona et al. | 345/145 |
| 5,701,140 A | 12/1997 | Rosenberg et al. | 345/161 |
| 5,709,219 A | 1/1998 | Chen et al. | 128/782 |
| 5,719,561 A | 2/1998 | Gonzales | 340/825.46 |
| 5,734,373 A | 3/1998 | Rosenberg et al. | 345/161 |
| 5,736,978 A | 4/1998 | Hasser et al. | 345/173 |
| 5,739,811 A | 4/1998 | Rosenberg et al. | 345/161 |
| 5,742,278 A | 4/1998 | Chen et al. | 345/156 |
| 5,767,839 A | 6/1998 | Rosenberg | 345/161 |
| 5,798,752 A | 8/1998 | Buxton et al. | 345/146 |
| 5,805,140 A | 9/1998 | Rosenberg et al. | 345/161 |
| 5,828,197 A | 10/1998 | Martin et al. | 318/567 |
| 5,831,408 A | 11/1998 | Jacobus et al. | 318/568.11 |
| 5,844,560 A | 12/1998 | Crutcher et al. | 345/354 |
| 5,875,311 A | 2/1999 | Bertram et al. | 395/309 |
| 5,880,411 A * | 3/1999 | Gillespie et al. | 178/18.01 |
| 5,952,998 A * | 9/1999 | Clancy et al. | 345/173 |
| 5,999,168 A * | 12/1999 | Rosenberg et al. | 345/161 |
| 6,046,726 A * | 4/2000 | Keyson | 345/156 |
| 6,100,874 A * | 8/2000 | Schena et al. | 345/157 |

OTHER PUBLICATIONS

Fish, Daniel E., "Statement of Purpose" from the Application for Admission to study at the Media Laboratory of the Massachusetts Institute of Technology (submitted 1/98).

Fitzmaurice, George W., Buxton, William, "An Empirical Evaluation of Graspable User Interfaces: Towards Specialized, Space–Multiplexed Input" (1997) (pp. 43–50). CHI 97, Atlanta, GA.

Fitzmaurice, George W., Ishii, Hiroshi, Buxton, William, "Bricks: Laying the Foundations For Graspable User Interfaces" (May 1995) (pp. 442–449). CHI '95, Denver, CO.

Hinckley, Ken, Pausch, Randy, Proffitt, Dennis, Patten, James, and Kassell, Neal, "Cooperative Bimanual Action" (1997) (pp. 27–34). CHI 97, Atlanta, GA.

Kabbash, Paul, Buxton, William, and Sellen, Abigail, "Two Handed Input In A Compound Task" (1994) (pp. 417–423). CHI94–4–94, Boston, MA.

Kurtenbach, Gordon, Fitzmaurice, George, Baudel, Thomas and Buxton, Bill, "The Design Of A GUI Paradigm Based On Tablets, Two–Hands, and Transparency" (1997)(pp. 35–42). CHI 97, Atlanta, GA.

* cited by examiner

FORCE FEEDBACK COMPUTER INPUT AND OUTPUT DEVICE WITH COORDINATED HAPTIC ELEMENTS

CROSS-REFERENCES

This application is related to Disclosure Document No. 431794 entitled "ACTIVE MULTI-TOUCH INPUT SURFACE (AMTIS)," having D. E. Fish as inventor. This disclosure document is hereby incorporated by reference herein, in its entirety and for all purposes.

BACKGROUND

1. Field of Invention

This invention relates to computer input and output devices, specifically to those which provide force feedback, and to those which can be used as a pointing device for graphical user interfaces.

2. Description of Prior Art

Computers are becoming increasingly important as a productivity tool. They continue to improve dramatically in terms of computational speed, memory, storage and display. However, the interface between users and the computer has not changed significantly since the introduction of the mouse and the graphical user interface. The human-computer interface must be improved for users to increase their productivity and take better advantage of the new capabilities computers provide.

Many common computer interface operations are best performed with a direct manipulation interface. For example, when using a drawing application, it is easier for the user to point at the object they wish to select, rather than use a voice recognition interface in which they must describe the object they wish to select.

Typically, direct manipulation interfaces combine a high-resolution pointing device, used to move a cursor on the screen, with some way to initiate an action at the current location. For example, a mouse may employ rotary optical encoders to measure the distance moved, and one or more buttons for "clicking" on the object beneath the cursor (e.g., selecting, actuating, dragging, or otherwise manipulating an on-screen object.).

While this was a significant improvement over previous devices, such an interface does not come close to fully exploiting the abilities people have to manipulate objects with their hands. Existing devices have one or more of the following drawbacks:

No Direct Mapping Between the Hand and the Display

Direct mapping is used herein to describe the case where a one-to-one correspondence exists between the position of a cursor on a screen and the position of a user's hand, and also implies that there is a unique hand position for every cursor position. Input devices which do not move, such as trackballs, joysticks, the IBM TrackPoint™ and the Synaptics TouchPad, lack such a direct mapping. No matter where the cursor is, the user's hand is in essentially the same location. A mouse also lacks a direct mapping, for at least two reasons. First, there is a non-linear relationship between the speed of the mouse and the speed of the cursor on the screen. This results in a different position depending on how quickly the mouse is moved from one location to another. Second, the mouse is often picked up and moved during use, particularly if the working area is limited.

Direct mapping is important because it better leverages a user's spatial skills. Humans have a keen sense of the position of their hands in relationship to their body and their environment. Taking advantage of these spatial skills is valuable because the cognitive load placed on the user by the computer interface is decreased, leaving the user's attention available for performing work. For example, when dragging an object from one point on the screen to another, a user must pay close attention to a cursor's position and look for visual feedback indicating the cursor is positioned properly, in order to manipulate an on-screen object. During this process, the user's attention is not available for other tasks (e.g., reviewing files, program output, and the like). Some existing input devices have a direct mapping between the hand and the screen, such as touch screens and digitizing tablets. These devices suffer from other infirmities, as described below.

Lack of Dynamic Haptic Feedback

Haptic feedback is a preferable characteristic for input devices. The term haptic feedback as used herein means communicating information to a user through forces applied to the user's body. Typically, the position of some portion of an input device changes along at least one degree of freedom depending on the force applied by the user. For example, when pressing a button on a mouse, the button does not move until the applied force reaches a certain threshold, at which point the button moves downward with relative ease and then stops (e.g., the sensation of "clicking" a button). The change in the position of the button communicates to the user through their sense of touch that the mouse click was successful. Note that a device with haptic feedback can be an input device (initiating an action) and an output device (giving haptic feedback indicating that the action was initiated) simultaneously.

Input devices that are completely devoid of haptic feedback, such as membrane keyboards and touch screens, have not gained widespread acceptance for desktop computers as a result of this deficiency. Thus when using such input devices, users are uncertain whether a finger press was registered by the computer and so must pay special attention to visual or auditory feedback to get this confirmation. This decreases data entry rates, making users less productive and the computer interface less enjoyable to use.

Mice, trackballs, joysticks, and other devices often provide buttons for initiating actions that provide haptic feedback. For example, the stylus used with a graphics tablet has a spring in its tip so the position of the pen relative to the tablet can vary depending on the applied force. However, such devices have the same haptic response regardless of the state of the user interface. For example, if a user clicks the mouse on a graphical button that is disabled, the haptic response of the mouse button is no different from that of clicking a button that is enabled, and so is misleading to the user because no action will result from the click. What is needed is an input device which provides dynamic haptic feedback. Haptic feedback is termed herein as being dynamic to indicate that the haptic feedback can be altered over time (e.g. by means a software application) in order to provide additional information to a user.

A number of devices having dynamic force feedback exist. Most of these lack a direct mapping between the hand and the device (e.g. force-feedback joysticks). Others have a direct mapping but are primarily designed for use in three-dimensional applications such as virtual reality or tele-operation. Most productive work done on computers is two-dimensional in nature, such as spreadsheets and page layout. These productivity applications would not enjoy significant benefits from the use of a three-dimensional input device. These devices have additional drawbacks, as outlined below.

User Interaction is Encumbered or Impeded

Many input devices encumber the user by requiring them to move at least a portion of the input device during use. For example, the time it takes to move the cursor across the screen with a mouse is increased because the user must accelerate and decelerate the mass of the mouse, in addition to the mass of their hand. Other input devices do not add inertia but impede the user in other ways. With a trackball, for example, multiple sweeping motions are required to move the cursor large distances, which is awkward and time consuming. With a joystick, for example, the force applied relates to the speed of the cursor on the screen, which may require the user to wait when the cursor is moving relatively large distances.

Any input device which must be located and/or manipulated before use suffers from such problems to at least a certain extent (e.g., mice and some force reflecting interfaces, among others). For example, if a person not currently using a computer and wants to press a graphical button on computer's display, they must find and grasp the mouse, move the mouse to position the cursor over the button, and then click the button. In contrast, a touch screen leaves the user unencumbered. They can reach out and press a graphical button on the display directly, with no intermediate steps. A touch screen, however, suffers from the previously-described infirmity of lacking haptic feedback.

Insufficient Support for Multiple Interactions

Most input devices, such as the mouse, trackball, joystick, the Synaptics TouchPad and the IBM TrackPoint™, only support a single interaction at a time. However, people have two hands which they are innately able to use together. Two single-interaction devices have been combined to provide two points of control, but confusion can arise because the correspondence between screen cursors and pointing devices is not apparent. Because these devices lack a direct mapping to the screen, their physical positions cannot resolve the correspondence between an input device and its cursor. Moreover, no provision is made for the interaction of multiple users. With a single input device, only a single user may "own" the device at any given time, and (given a single input device) users must take turns interacting with the computer. This is obviously a cumbersome and awkward technique when multiple users wish to work collaboratively on a given project.

SUMMARY OF THE INVENTION

Embodiments of the present invention overcomes conventional limitations by providing a device having a direct mapping, for example, between the touching portion of a user's hand and the position of a cursor on a display and an output in the form of dynamic haptic feedback, without encumbering or impeding the user and allowing a large number of simultaneous interactions. The device provides direct mapping to reduce the conscious effort required for relatively pedestrian tasks such as interacting with a graphical user interface (GUI). The user's interaction with the device is not hampered by a need to laterally move any portion of the device.

The device provides dynamic haptic feedback. Haptic feedback is termed herein as being dynamic to indicate that the haptic feedback can be altered over time (e.g. by means a software application) in order to provide additional information to a user. In the previous example, a disabled button would have a different feel from that of an enabled button, allowing a user to discern that a graphical button was not enabled, using their sense of touch. The device also supports multiple interactions. Having more than two points of control is useful when multiple users collaborate at the same computer. Allowing a large number of interactions at once allows multiple users to interact with the computer simultaneously. Another benefit of having more than two points of control is the ability of a user to employ multiple fingers for pointing purposes, even in combination.

Embodiments of the present invention take the form of an input and output device for a processor. In one embodiment, an input/output device has a horizontal two-dimensional area which can be touched simultaneously (e.g., with the hands) in multiple places. The location of each touch is measured and the area surrounding each touch moves vertically and provides dynamic haptic feedback to the user. The device has a control processor that communicates with another processor on which software applications are executed. The control processor continually sends the current attributes of all touches in progress, and receives commands which specify the type of haptic response each touch should exhibit.

The touchable area is comprised of a grid of haptic elements, referred to herein as haptels. Haptel is used herein to describe a haptic feedback device with linear motion having a touchable surface substantially perpendicular to the direction of motion. A haptic feedback device is used herein to describe an input and output device with a moving portion manipulated by a user, one or more sensors that measure the position and/or various derivatives of position and/or the forces applied to the moving portion, one or more effectors which can apply forces to the moving portion, and a processor which measures the sensors, computes a response, and drives the effectors to create a range of haptic effects.

In one embodiment, each haptel includes a position sensor to measure the vertical position of the surface within its range of travel, an electromagnetic linear actuator to provide a controllable vertical bi-directional feedback force, and a touch location sensor to measure the coordinates of a single touch within its bounds. Preferably, the haptel grid is covered by a single sheet of flexible material that protects the haptels and hides the grid from view.

The haptels have their sensors and effectors interfaced to a control processor. The control processor measures the position of haptel surfaces and allows information such as velocity, acceleration, and applied force to be derived. Alternatively, sensors can be included in each haptel to provide such measurements (and others) directly. The control processor computes the desired feedback force for each haptel and drives the actuators to generate the appropriate forces. The haptic response of each haptel may be configured to be essentially arbitrary within a certain range. The range of available effects depends on the type of sensors employed, the bandwidth and precision of the sensors and effectors, the resolution of the analog-to-digital and digital-to-analog conversion performed, the amount of available processing power and the update frequency of the control loop, among other factors. These tradeoffs would be apparent to one skilled in the art of force feedback design.

Because the touchable area is comprised of many haptels, each of which can function independently, the device allows multiple touches at once. Each haptel responds to only one touch at a time, so that there is a lower bound on the distance between two touches which do not interfere with each other. The worst-case value of this minimum distance is approximately the diagonal size of a haptel. However, in a specific instance the minimum distance can be substantially smaller depending on the locations of the two touches. Smaller haptels allow touches to be closer to one another.

A typical interaction is a user pressing a graphical button displayed as part of a GUI. The finger touches the device, landing on a specific haptel. The overall location of the touch is determined by the touch location sensor of the haptel in combination with the location of that haptel within the haptel grid. The touch location is communicated to a processor (e.g., a computer) which discovers that a graphical button is "underneath" the touch, and therefore communicates this information to the control processor to use a "button" haptic response for this touch. As the user presses down on the haptel, the control processor responds with a feedback force which increases as the surface is depressed until the position reaches a certain threshold, at which point the feedback force is quickly reduced. This causes the applied force to momentarily exceed the feedback force, which results in the quick downward movement of the haptel surface. In this way a "clicking" sensation is conveyed to the user. Preferably, the computer is continually informed of the state of the touch so that when the haptel reaches the bottom of its travel, the computer executes the action represented by the graphical button and displays the button in its activated state.

If the graphical button is disabled, the computer has the control processor use a "disabled button" haptic response. In this response the feedback force increases with position at a higher rate than the "button" response with no force drop-off. This creates the sensation of an unyielding surface which informs the user than the action represented by the graphical button cannot be initiated.

The preceding descriptions assume that each touch falls within the bounds of a single haptel, but this need not be the case. If the touchable area of the device is mapped to a GUI in which interface elements can be placed anywhere, some will happen to be located on the edge between two haptels or the vertex where four haptels meet. A touch on such a control is therefore likely land on more than one haptel. Such "border touches" can be transparently handled by the device. The first step is to merge related touches. If two touches appear simultaneously on adjacent haptels a short distance apart, the device can safely infer that the touches are really a single touch on the border between those two haptels. Similar inferences can be made for touches that appear simultaneously near the vertex of any number of haptels.

Once the set of haptels is determined, the haptels are managed in a coordinated fashion. The center of the touch is computed, preferably by weighting each touch location by the force applied to that haptel, and then dividing by the total force applied to the haptels involved. Likewise, the collective surface position, velocity, and acceleration are computed, preferably by weighted average of the haptels involved. Other weightings are possible, including equal weighting of values. The applied force measurements of the haptels involved may be summed to compute the total force applied. The haptic response is then computed from these collective measurements in much the same way they would be computed for a single haptel, resulting in a collective feedback force. This feedback force is distributed across the haptels involved in the touch in proportion to the amount of the total applied force lands on each haptel. In addition, a restoring force pulls the haptels towards the collective position to prevent surfaces from drifting apart due to measurement errors and other factors. As a result, the total feedback force is effectively distributed across the haptels involved in the touch, and the haptel's surfaces will have similar position, velocity, and acceleration. This provides the illusion that a single surface was pressed, making the coordinated nature of the touch undetectable by the user.

Not only can such device coordinate a fixed set of haptels, but it can also transparently add and remove haptels from the coordination set over time. This is necessary during "dragging" operations in which touches move across the device. When a touch gets close to another haptel, the newly-added haptel is added to the coordination set. This has the effect of causing its surface to become flush with the haptels already involved in the touch. Preferably, this is done without affecting the feel of the touch in progress. When the touch moves far enough away from a given haptel, that haptel is removed from the coordination set, leaving it free to participate in another touch.

This coordination effectively makes the haptels' gridded nature invisible to the user and to software applications. The computer specifies the response for a touch in a declarative fashion, and the device ensures that this response will be generated regardless of where the touch falls, how many haptels are involved in the touch, or whether the touch moves. Device-specific information provided to the computer might include the minimum allowed distance between independent touches, so that the computer can separate controls designed for simultaneous use appropriately or give feedback to the user when one touch ventures too close to another.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. In the drawings, related figures have the same number but different alphabetic suffixes.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description. In addition, the following detailed description has been divided into sections, subsections, and so on, to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

Haptel Description

Figures 1, 2:
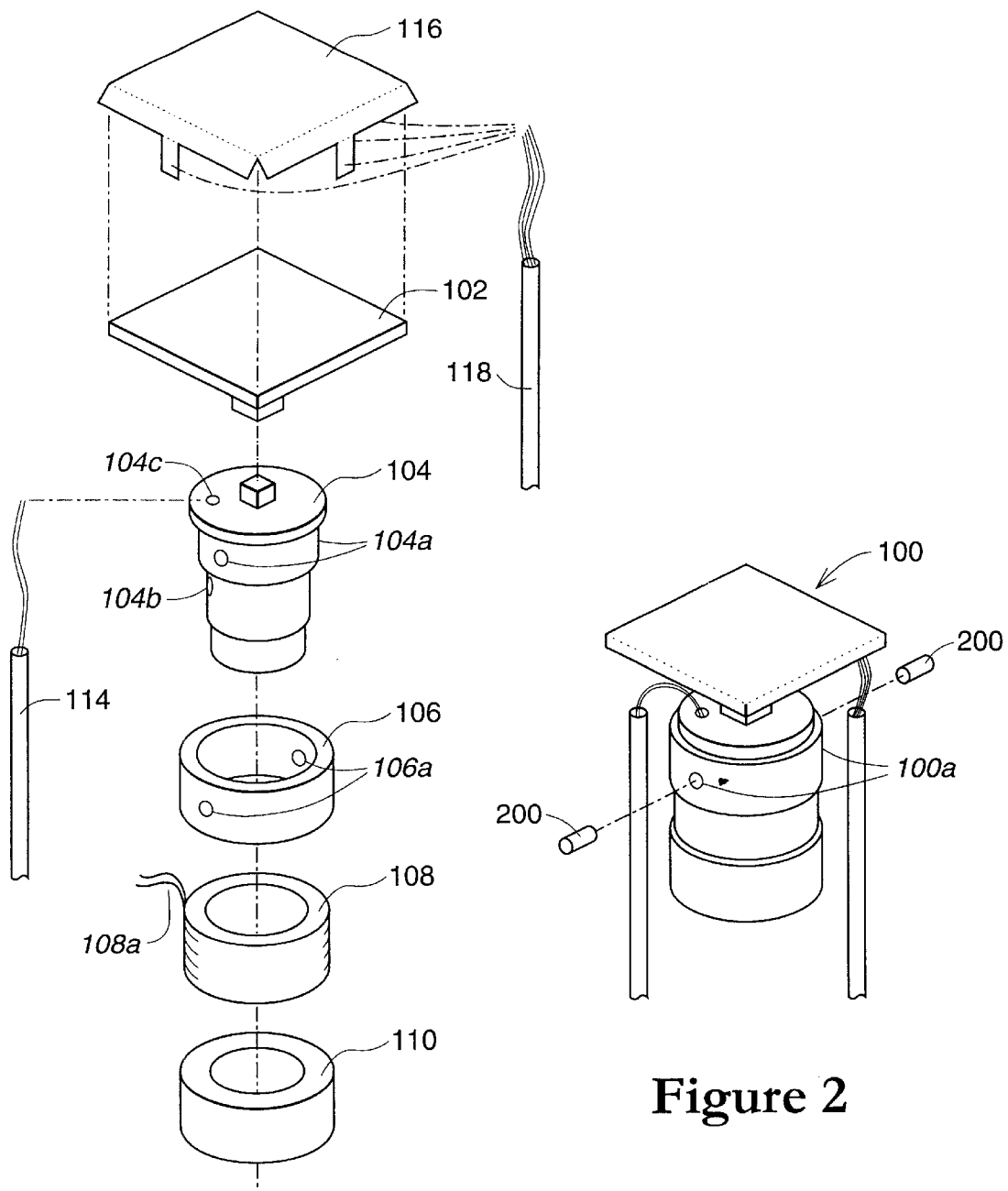
FIG. 1 is a schematic exploded perspective representation of a portion of one embodiment of the invention, showing parts which comprise a haptel moving assembly.
FIG. 2 is a schematic exploded perspective representation of a portion of one embodiment of the invention, showing a haptel moving assembly and constraint pins.

FIG. 1 illustrates various aspects of one embodiment of a haptel according to the present invention and exemplified by a haptel 500. Haptel 500 includes, primarily, two assemblies: a moving assembly 100 and stationary assembly 300. FIG. 1 illustrates an exploded perspective view of the parts of moving assembly 100. An XY sensor 116 is attached to the top of a surface 102, which is in turn coupled to a coil holder 104. Edges of XY sensor 116 are preferably folded around surface 102 and fixed into place by glue, for example. An XY cable 118 is provided to couple XY sensor 116 to an XY interface (not shown), to be described later. XY sensor 116 may be implemented using, for example, a four wire resistive film touch sensor. An upper bearing 106 and a lower bearing 110 preferably fit closely around coil holder 104 and are held in by glue, for example. Upper bearing 106 is rotationally aligned with coil holder 104 such that bearing pin holes 106a are aligned with coil pin holes 104a, constituting constraint pin holes 100a. Magnet wire 108 is wound around coil holder 104 between upper bearing 106 and lower bearing 110. Magnet wire ends 108a are routed through a lower wire hole 104b, through the interior of coil holder 104, and through an upper wire hole 104c. Magnet wire ends 108a are electrically coupled to a coil cable 114. Magnet wire ends 108a are mechanically but not electrically coupled (e.g., non-consecutively glued) to the top of coil holder 104 for purposes of strain relief.

Surface 102 and a coil holder 104 may be made, for example, of a non-ferromagnetic material with good heat conductivity (e.g., 6110-T6 aluminum alloy). Preferably, the interior sides of coil holder 104 are painted black and the interior top is painted white. Upper bearing 106 and lower bearing 110 are made of a low friction material, such as polytetraflouroethylene (PTFE). Coil cable 114 and XY cable 118 may be, for example, high-flexibility multi-conductor shielded cables, with jacket and shield removed from the flexing portion. Magnet wire 108 may be, for example, standard insulated magnet wire.

FIG. 2 illustrates an exploded perspective view of moving assembly 100 and constraint pins 200. This figure shows how constraint pins 200 fit into constraint pin holes 100a. Constraint pins 200 may be, for example, metal cylinders with a smooth surface, such as spring steel wire.

Figures 3, 4:
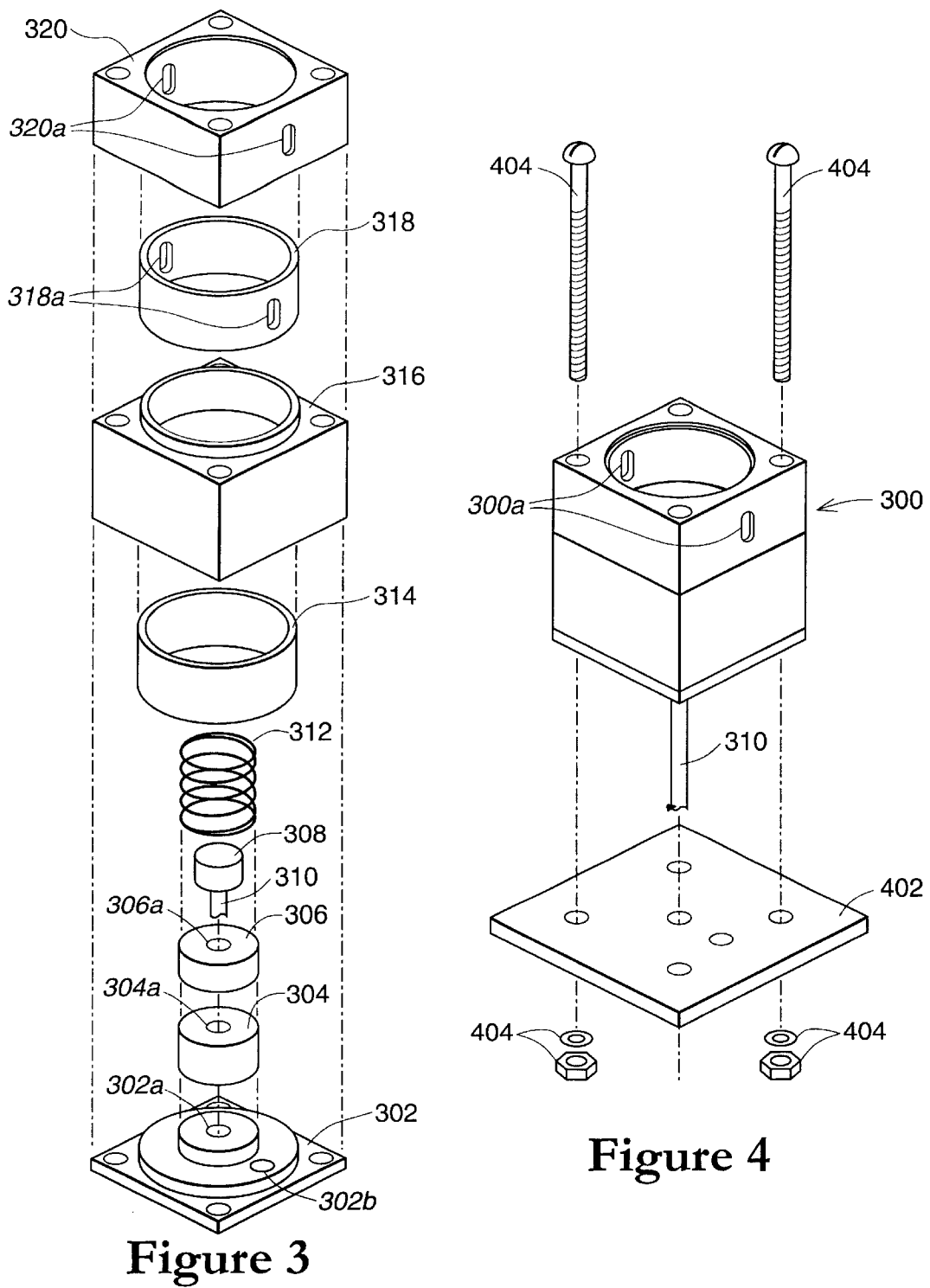
FIG. 3 is a schematic exploded perspective representation of a portion of one embodiment of the invention, showing parts which comprise a haptel stationary assembly.
FIG. 4 is a schematic exploded perspective representation of a portion of one embodiment of the invention, showing a haptel stationary assembly mounted to a support plate.

FIG. 3 illustrates an exploded perspective view of stationary assembly 300. In the embodiment shown in FIG. 3, a flux disk 306 is attached to a magnet 304, which in turn is attached to a base 302. A proximity sensor 308 is electrically coupled to a position cable 310, which passes through flux disk hole 306a, magnet hole 304a and base cable hole 302a. Position cable 310 couples proximity sensor 308 to a position circuit (not shown), to be described later. Position cable 310 is preferably a shielded four conductor cable. Preferably, the bottom of proximity sensor 308 is flush with the top of flux disk 306 and secured (e.g., glued into place). A spring 312 is affixed to flux disk 306 surrounding proximity sensor 308. A lower base bearing 314 preferably fits closely inside a midsection 316, and is secured (e.g., glued into place). Midsection 316 fits around the top of base 302 and is rotationally aligned to be square with base 302. Upper base bearing 318 fits closely inside top section 320, and is rotationally aligned such that bearing slots 318a are aligned with top slots 320a, constituting constraint pin slots 300a. Top section 320 fits closely around the top of midsection 316 and is rotationally aligned to be square with midsection 316 and base 302.

Magnet 304 is preferably a high-strength permanent magnet. Base 302, flux disk 306 and midsection 316 are preferably made of a ferromagnetic material with good permeability (e.g., steel alloy 12L14). The top and sides of flux disk 306 are preferably painted black before assembly. Top section 320 is preferably made of a non-ferromagnetic material (e.g., 6110-T6 aluminum alloy). Upper base bearing 318 and lower base bearing 314 are preferably made of a low-friction material (e.g., PTFE). Proximity sensor 308 may be implemented using, for example, a reflective proximity sensor containing an LED (not shown) and a phototransistor (also not shown).

FIG. 4 illustrates an exploded perspective view of a haptel stationary assembly 300 mounted to a support plate 402. Support plate 402 is made of a rigid material with good heat conductivity, such as aluminum plate. It will be noted that FIG. 4 shows only a portion of support plate 402. Mounting hardware 404 may consist of two sets of machine screws, nuts and washers, for example. In one embodiment, the machine screws are routed through two diagonally opposite holes in haptel stationary assembly 300 and through support plate 402, and are fastened securely to the other side using nuts and washers. Position cable 310 is routed through a center hole in support plate 402. The hole pattern in support plate 402 should match the hole pattern in base 302.

Figures 5A, 5B:
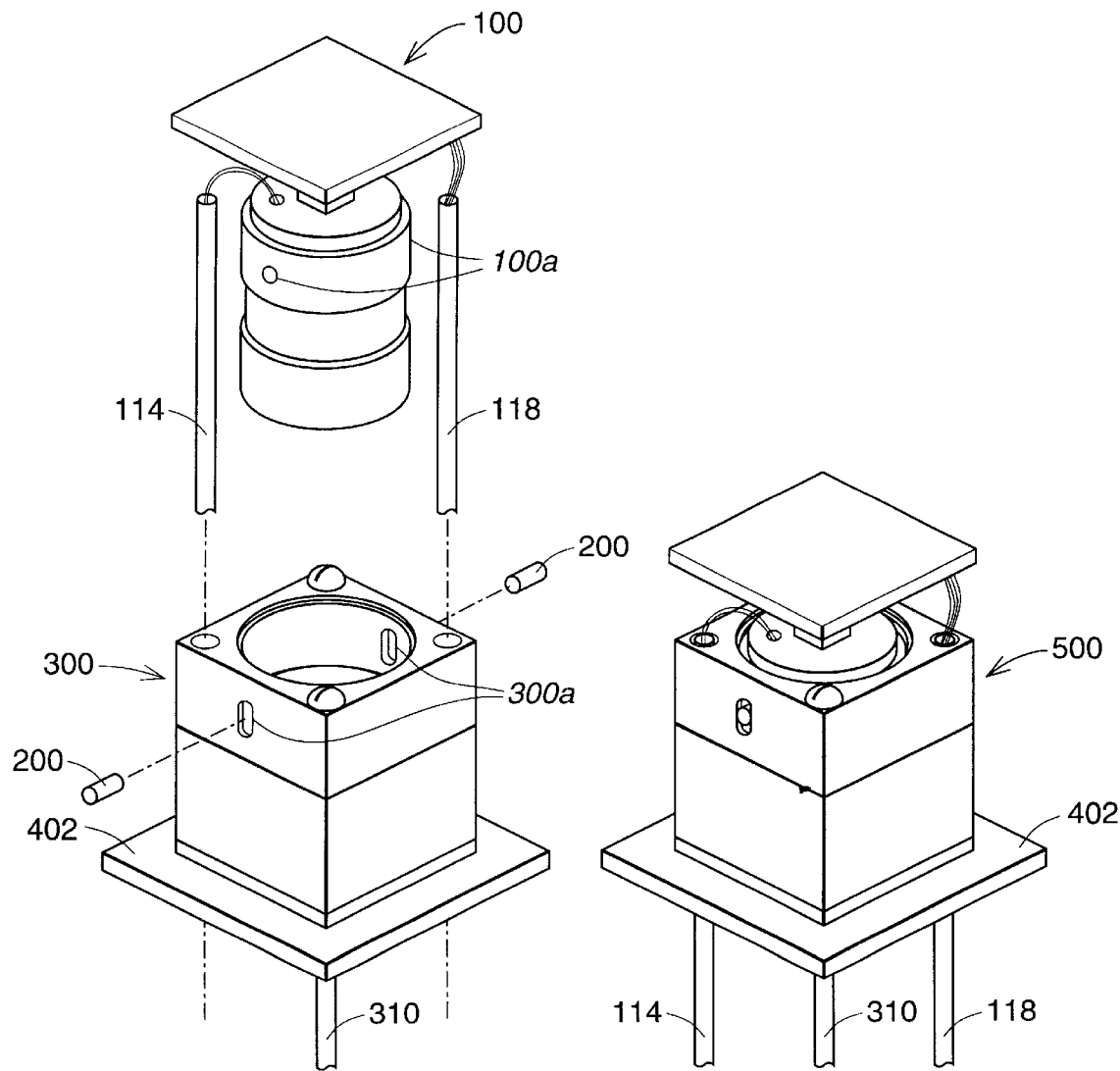
FIG. 5A is a schematic exploded perspective representation of a portion of one embodiment of the invention, showing the parts and assemblies which comprise a haptel.
FIG. 5B is a schematic perspective representation of a portion of one embodiment of the invention, showing a haptel.

FIG. 5A illustrates an exploded perspective view of the parts and assemblies of a haptel such as haptel 500. FIG. 5B illustrates a perspective view of haptel 500. Moving assembly 100 fits inside stationary assembly 300. Moving assembly 100 is preferably aligned such that constraint pin holes 100a are aligned within constraint pin slots 300a, making surface 102 of moving assembly 100 square with stationary assembly 300. Constraint pins 200 are glued into constraint pin holes 100a, fitting within, but not affixed to, constraint pin slots 200a. Coil cable 114 and XY cable 118 are routed through the remaining corner holes in stationary assembly 300 and support plate 402.

Grid Description

Figure 6A:
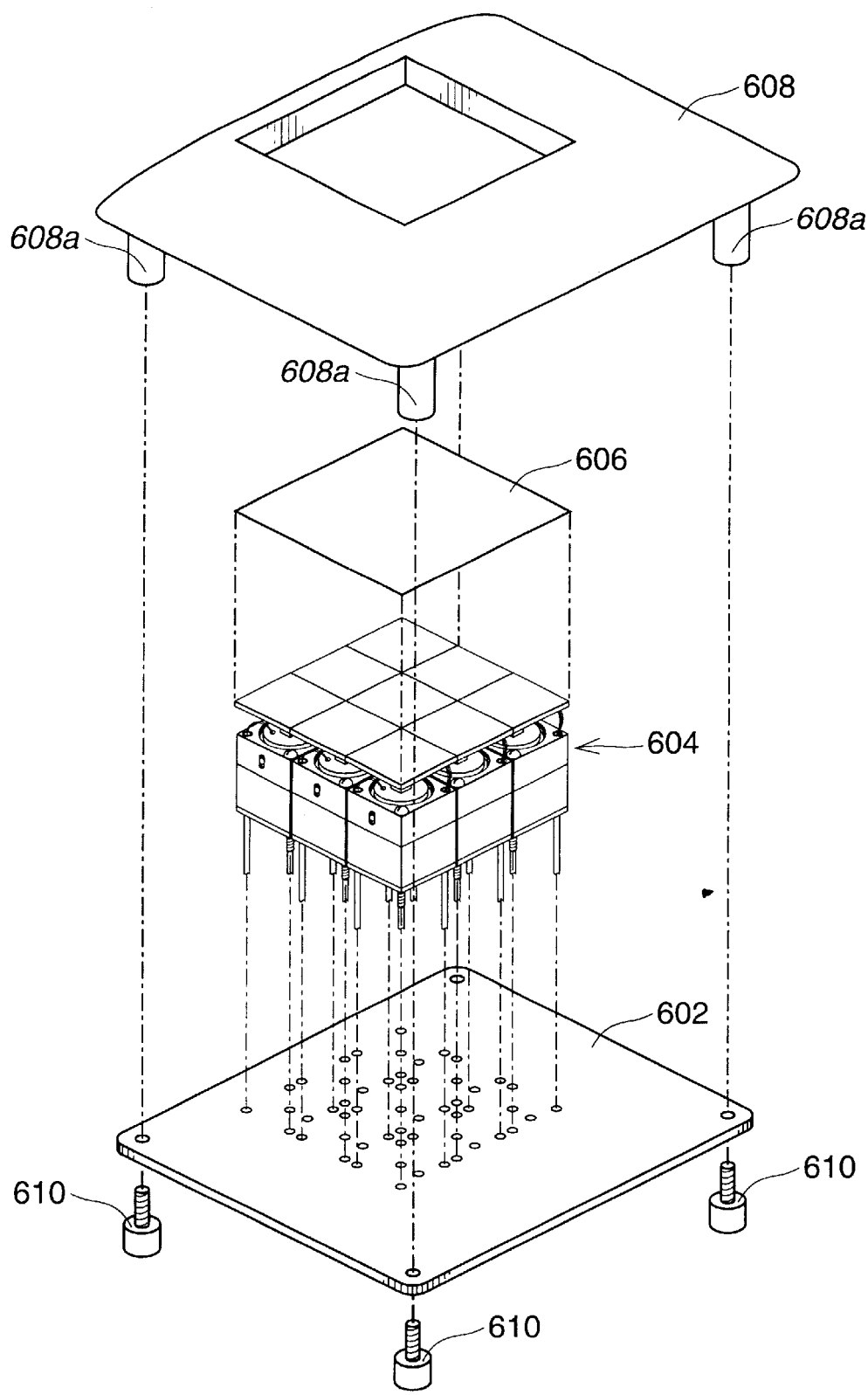
FIG. 6A is a schematic exploded perspective representation of one embodiment of the invention, showing parts and assemblies which comprise a haptel grid with a flexible overlay and a hand rest.
Figure 6B:
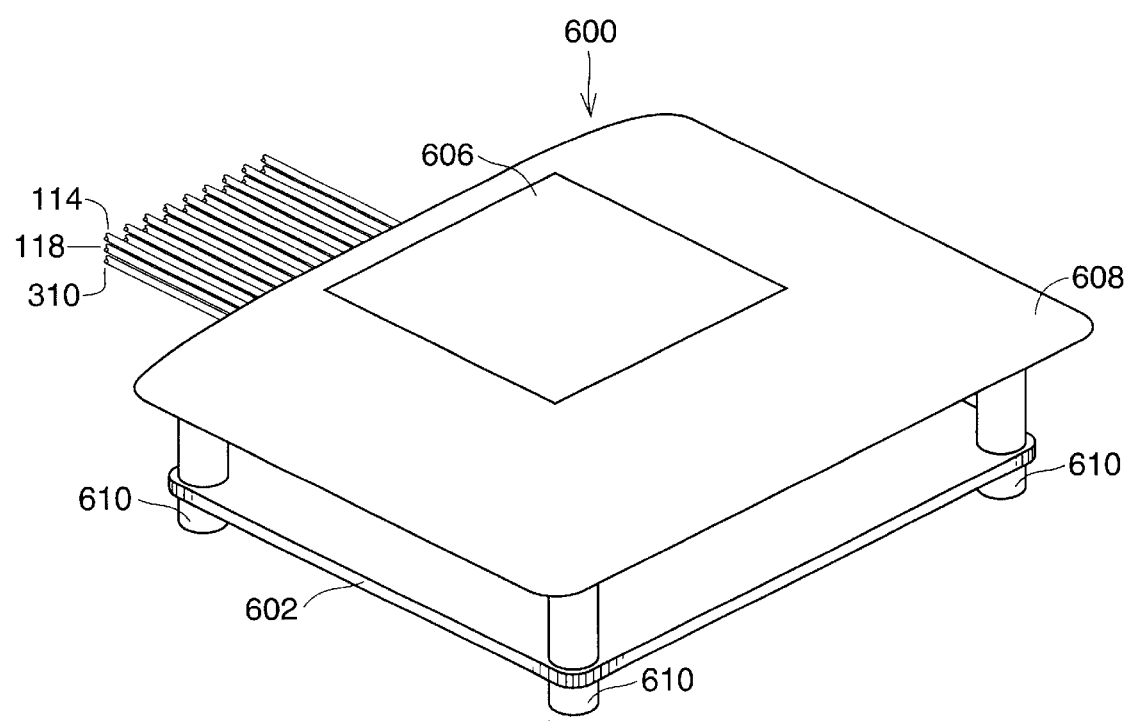
FIG. 6B is a schematic perspective representation of a portion of one embodiment of the invention, showing a haptel grid with a flexible overlay and a hand rest.

FIG. 6A illustrates an exploded perspective view of the parts included in grid assembly 600. FIG. 6B illustrates a perspective view of grid assembly 600.

Unified support plate 602 is shown in FIG. 6A as having nine haptels (e.g., haptel 500) in a 3×3 grid configuration.

Unified support plate 602 replaces support plate 402 for all haptels in the grid. The rectangularly arranged set of nine haptels is referred to as a haptel grid 604. The bolts, coil cables, position cables, and XY cables of all haptels go through appropriately positioned holes in unified support plate 602. In addition, there is a hole in the unified support plate beneath each base air hole 302b. Preferably, grid overlay 606 is affixed to haptel grid 604 at the centers of the haptel surfaces. Grid overlay 606 is a thin, slick, flexible and stretchable material, such as 0.010" thick urethane elastomer sheet with 60 Shore A durometer hardness. Hand rest 608 is affixed to support plate 602 with grid feet 610. Hand rest 608 is preferably made of injection molded plastic, while grid feet 610 are preferably plastic with standard screws centrally embedded therein. The screws projecting from grid feet 610 preferably thread into holes in vertical supports 608a. The height of vertical supports 608a ensures that the upper surface of hand rest 608 is flush with the upper surface of haptel grid 604 when assembled.

System Description

Figure 9:
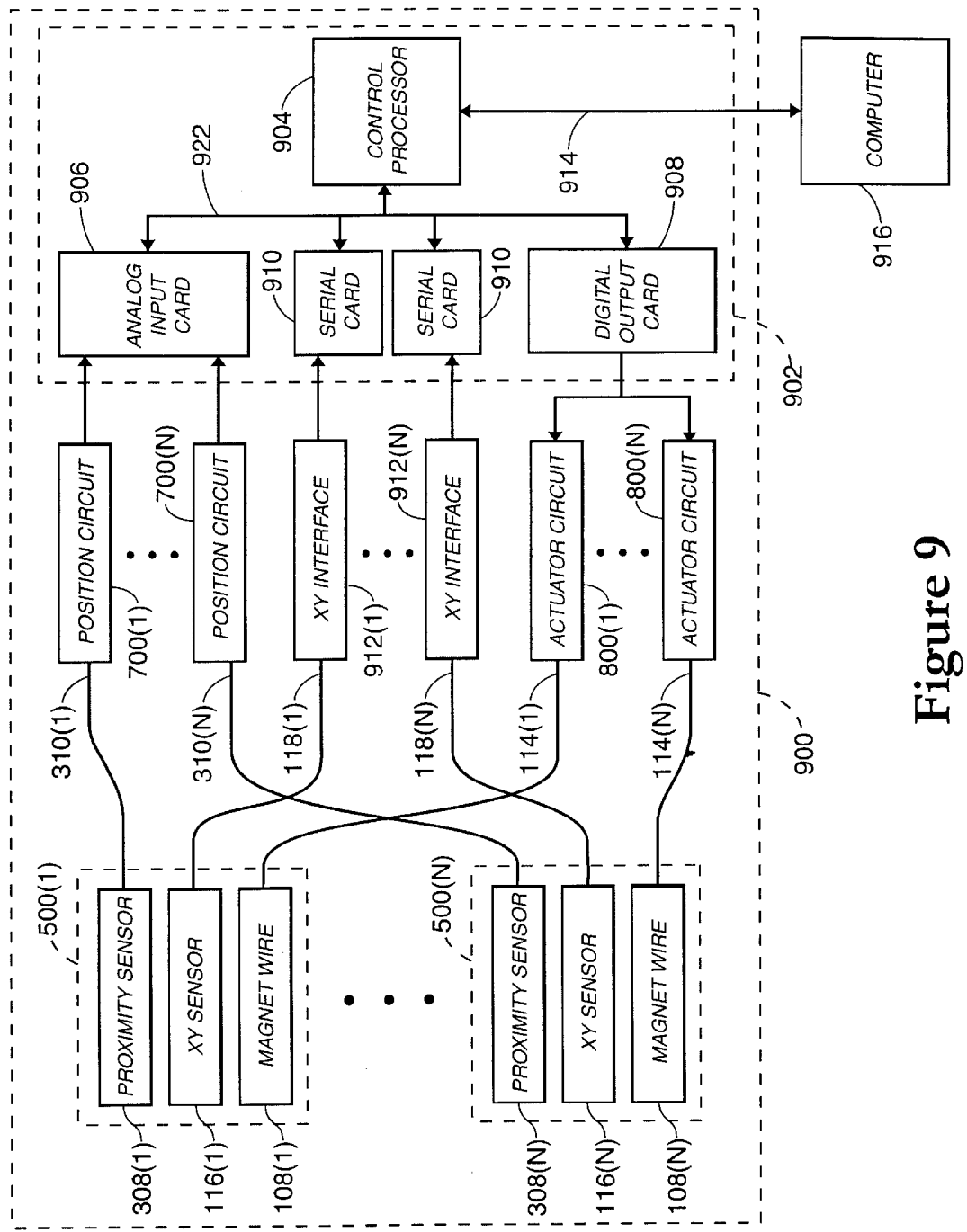
FIG. 9 is a block diagram showing the elements of one embodiment of the invention.

FIG. 9 illustrates a block diagram depicting the functional elements of an embodiment of the present invention. An input/output (I/O) device 900 includes haptels 500(1)-(N), position circuits 700(1)-(N), actuator circuits 800(1)-(N), XY interfaces 912(1)-(N) and a control system 902. Control system 902 includes an analog input card 906, two serial cards 910, a digital output card 908, and a control processor 904. Functional elements of haptels 500(1)-(N) are shown as a group containing magnet wires 108(1)-(N), proximity sensors 308(1)-(N) and XY sensors 116(1)-(N).

It will be noted that the variable identifier "N" is used in several instances in FIG. 9 to more simply designate the final element (e.g., haptel 500 (N), XY sensor 116(N), and so on) of a series of related or similar elements (e.g., haptels 500(1)-(N), XY sensor 116 (1)-(N), and so on). The repeated use of such variable identifiers is not meant to imply a correlation between the sizes of such series of elements, although such series may be equal in extent. The use of such variable identifiers does not require that each series of elements have the same number of elements as another series delimited by the same variable identifier. Rather, in each instance of use, the variable identified by "N" may hold the same or a different value than other instances of the same variable identifier. For example, haptel 500(N) may be the ninth in a series of haptels, whereas XY sensor 116(N) may be the forty-eighth XY sensor in a series of XY sensors. In the preferred embodiment, N equals nine for all series.

Figure 7:
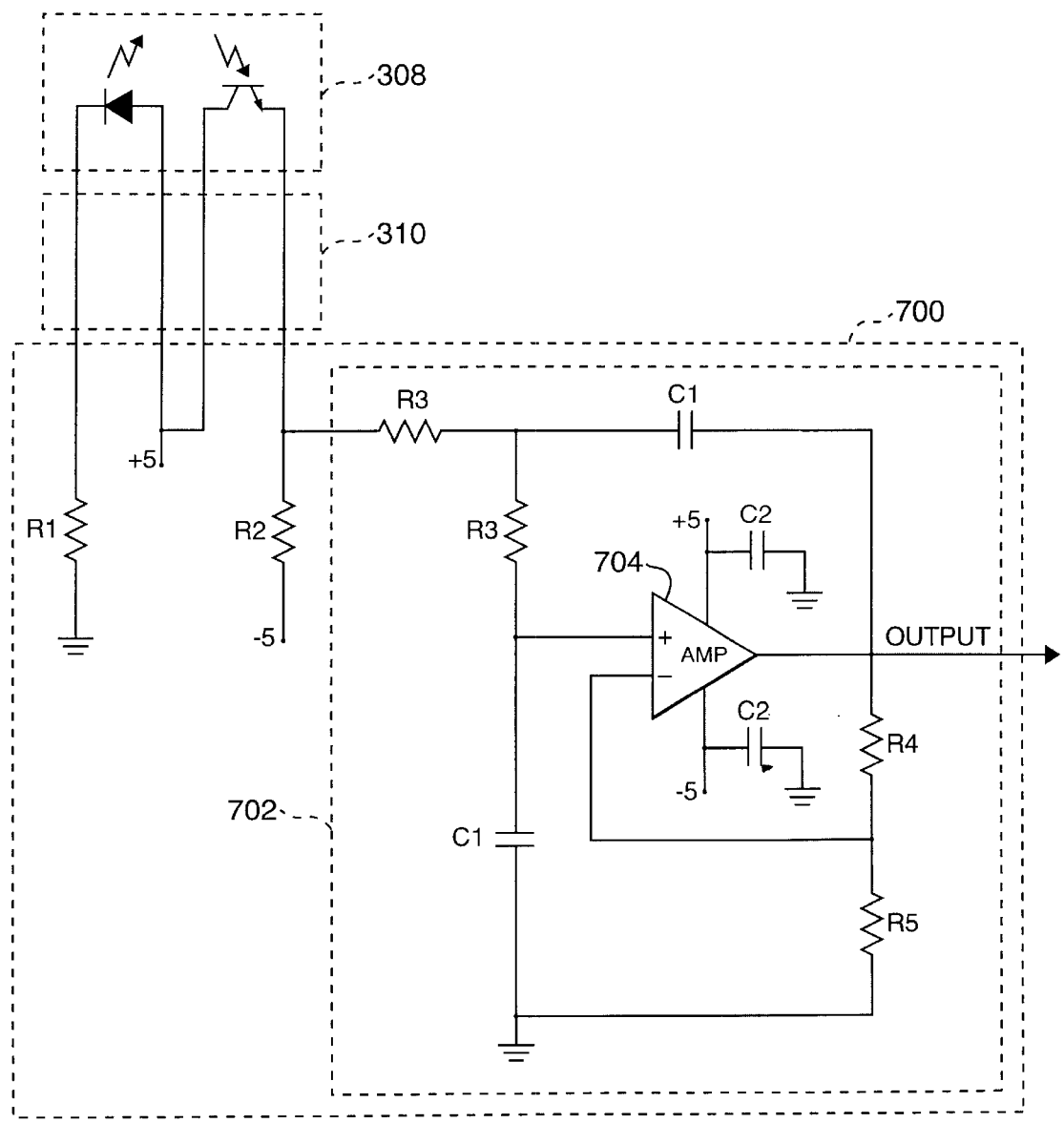
FIG. 7 is a schematic of a circuit for measuring haptel surface position.

Each one of haptel proximity sensors 308(1)-(N) is coupled via a corresponding one of position cables 310(1)-(N) to a corresponding one of position circuits 700(1)-(N) as described in FIG. 7. The output of each one of position circuits 700(1)-(N) is coupled to an input of analog input card 906, which is installed in control system 902 and communicates with control processor 904 via a communications channel such as PCI bus 922. Analog input card 906 is preferably a high-speed data acquisition card with a number of inputs corresponding to the number of haptels in haptel grid 604 and may employ devices such as those available from National Instruments of Austin, Tex. under the trade designation PCI-6023E.

Figure 8:
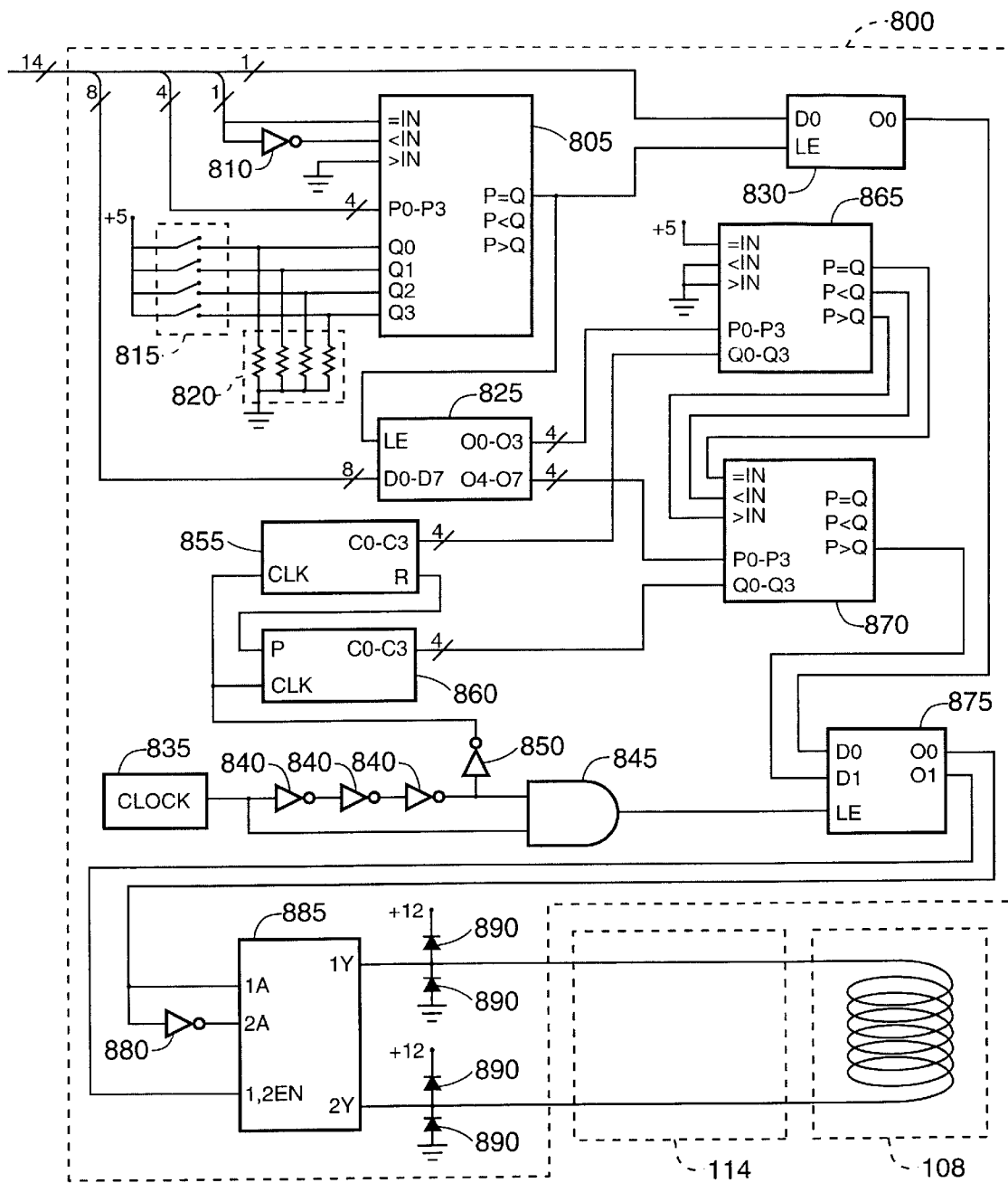
FIG. 8 is a schematic of a circuit for driving a haptel actuator.

Magnet wires 108(1)-(N) couple their respective haptel via one of coil cables 114 to the outputs of a respective one of actuator circuits 800(1)-(N), described in FIG. 8. The inputs of each of actuator circuits 800(1)-(N) are coupled to the outputs of digital output card 908 which is shared by actuator circuits 800(1)-(N). Digital output card 908 is installed in control system 902 and communicates with control processor 904 via a communications channel such as a device PCI bus 922. Digital output card 908 preferably provides at least 14 bits of parallel output, and may employ devices such as are available under the trade designation DIO-321 IS, from National Instruments.

Each one of haptel XY sensors 116(1)-(N) is coupled via a corresponding one of XY cables 118(1)-(N) to a corresponding one of XY interface 912(1)-(N). Each one of XY interface 912(1)-(N) digitizes readings from a corresponding one of XY sensors 116(1)-(N) and provides an interface (e.g., RS-232 serial interface) to this data. XY interfaces 912(1)-(N) may be implemented using devices such as those under the trade designation CS6000 and available from CyberTouch of Newbury Park, Calif. The serial port of each of XY interfaces 912(1)-(N) is coupled to a corresponding serial port on serial cards 910. Each serial card has eight ports, thus two serial cards are required to support the nine XY interfaces in this embodiment. Serial cards 910 are installed in control system 902 and communicates with control processor 904 via a communication channel such as PCI bus 922 using, for example, devices such as the National Instruments device designated PCI-232/8.

Control processor 904 is connected via serial link 914 to a computer 916. Typically, control processor 904 and computer 916 are both appropriately programmed general purpose processors. In one embodiment, computer 916 is a computer system such as a personal computer system. Other embodiments may include different types of computer systems. Computer systems may be found in many forms including but not limited to mainframes, minicomputers, workstations, servers, personal computers, notepads and embedded systems. A typical computer system includes at least one processing unit, associated memory and a number of input/output (I/O) devices. A computer system processes information according to a program and produces resultant output information via the I/0 devices. A program is a list of internally stored instructions such as a particular application program and/or an operating system. A software module may include a program. The programs that control the operation of a computer system are commonly referred to as software applications or simply software. Preferably, control processor 904 and computer 916 are implemented using a processor such as an Intel Pentium III operating at 550 MHz.

Operation

The operation of a device such as I/0 device 900 is now described. The mechanical operation of a haptel is first described, followed by a description of the operation of a proximity sensor and actuator. The operation of control system 902 is then described.

Haptel Mechanical Operation

In operation, the top of XY sensor 116 is pressed with a pointing element such as a finger or stylus causing moving assembly 100 to move up and down. Constraint pins 200 limit the vertical travel of moving assembly 100 and keep moving assembly 100 from rotating relative to stationary assembly 300. Spring 312 applies an upward force to moving assembly 100 which returns moving assembly 100 to an upper limit of travel when not depressed.

When XY sensor 116 is pressed anywhere other than at the exact center, a torque is applied to moving assembly 100. This torque causes moving assembly 100 to tilt and applies a normal force to the bearings that increases friction. To minimize this tilt, the gap between the inner and outer bearings is kept small, preferably less than a fifth of a millimeter, for example. The vertical spacing between the upper and lower set of bearings further reduces the tilt angle. Friction is minimized by making the bearings from a material having a very low coefficient of friction (e.g., PTFE). Even in the case of a touch at the far corner of surface 102, friction is preferably kept below 10% of the applied force. Minimizing off-axis friction ensures that the dynamics of I/O device 900 are kept as independent of touch location as possible.

Haptel 500 is designed such that moving assembly 100 can move freely with little tilt or rotation. This allows adjacent haptels to be positioned with minimal gaps between the edges of their surfaces and yet avoid contacting one another during use. Small gaps also tend to make the gaps between haptels less noticeable to the user. Preferably, base air hole 302b is present so air can move more freely in and out of the interior of haptel 500 during use. If not included, motion can be impeded as a result of the air escape between the inner and outer bearings.

When adjacent haptels are touched simultaneously, the haptels tilt slightly towards one another, but are prevented from touching due in part to the design and manufacturing tolerances selected. The seams between the haptel's surfaces are preferably such that such seams are largely invisible to the user. Grid overlay 606 also helps to make the seams between the haptels less noticeable. The material of grid overlay 606 is preferably somewhat stretchable. This allows adjacent haptel surfaces (e.g., surface 102) to be at different heights without the material of grid overlay 606 overly restricting their motion. The stretchiness required depends in part on the travel of the haptels and the size of their surfaces (e.g., surface 102).

A vertical travel of a few millimeters is adequate to simulate the haptic response of a key press, although the travel of a haptel's surface can vary from on the order of about 0.1 mm to about 2 cm (or more). The size of surface 102 is preferably as small as is feasible. This, in part, allows for more simultaneous touches and a smaller minimum distance between touches. In one embodiment, the size of surface 102 (for each haptel) preferably corresponds to that of a pixel. The mass of moving assembly 100 is preferably minimized in order to maximize the acceleration for a given actuator force and enable a greater range of useful haptic effects.

Precise manufacture of the haptel is important because the fingertip is very sensitive to shape and texture. The haptel surfaces are preferably well aligned with each other at both extents of their travel. Vertical alignment within 0.1 mm is preferred.

In general, the haptel surfaces can be of any size, and need not be square or even all of the same shape, so long as they are tiled with minimal gaps between their edges. This includes, for example, rectangular, triangular or hexagonal haptels, but other irregular or non-periodic tilings are possible. The overall shape of the touchable area can be any shape, such a rounded rectangle, an ellipse, or an irregular shape. Depending on the shape of the haptel surfaces and the shape of the touchable area, some portion of the haptels on the edges of the tiling might be unused, and perhaps covered with the hand rest to prevent use or indicate the touchable portion.

Preferably, high flexibility wire is used for coil cable 114 and XY cable 118 because of the relatively large motion of the moving assembly relative to the short length of the wires. The wire is preferably very finely stranded wire with silicone insulation. The wires should not significantly impede the motion of the moving assembly. Suitable parts are exemplified by devices with trade designation AS999-30-2SJ for the two conductor coil cable and AS-155-28-5SJ for the five conductor XY cable, available from Cooner Wire of Chatsworth, Calif.

Proximity Sensor Operation

Proximity sensor 308 is preferably designed to provide high resolution and bandwidth at a reasonable cost. High resolution increases the fidelity of the haptic display in general and in particular improves the quality of velocity and acceleration measurements derived from the output of proximity sensor 308. Proximity sensor 308 preferably provides a resolution of 0.05 mm, and most preferably a resolution of about 0.01 mm.

The position of moving assembly 100 within its range of travel is measured by proximity sensor 308. In one embodiment, proximity sensor 308 contains an infrared LED and an infrared phototransistor in the same enclosure. In such a device, the LED and phototransistor point upward and are optically isolated from each other within proximity sensor 308. An example of such a device is available from Optek of Carrollton, Tex. under the trade designation OPB-710.

Position circuit 700, shown in FIG. 7, interfaces proximity sensor 308 to analog input card 906. Resistor RI limits the current through the LED to an allowed value, causing the LED to emit a constant amount of light. A typical value would be 76.8 Ohm. The light emitted by the LED is reflected by the interior top of coil holder 104. Some of the reflected light is received by the phototransistor. The current through the phototransistor is proportional to the quantity of light falling thereon. Resistor R2 converts this phototransistor current to a voltage which forms the input of low pass filter 702. A typical value for R2 is 2.21 kOhm. Low pass filter 702 is a voltage-controlled voltage-source 2-pole Butterworth filter with a 3 dB roll-off point at 1.3 kHz and gain of 1.59. Typical component values are 12.1 kOhm for resistor R3, 0.01 microFarad for capacitors C1, 33.2 kOhm for resistor R4, 56.2 kOhm for resistor R5, and 0.1 microFarad for bypass capacitors C2. Op amp 704 is a CMOS operational amplifier with rail-to-rail operation. Suitable parts are available from National Semiconductor of Santa Clara, Calif. under trade designation LMC6482. The frequency roll-off of the low-pass filter is preferably lower than half of the per-channel sampling rate of the analog input card. Additionally, it will be noted that, preferably, the phototransistor provides bandwidth commensurate with its sampling rate. Using a 12-bit resolution analog input card as analog input card 906, control system 902 can discern between moving assembly positions separated by about 0.01 mm.

The interior top of coil holder 104 is preferably painted to diffusely reflect infrared light. Diffuse reflectivity ensures that the phototransistor current varies smoothly and monotonically with distance, and provides a consistent reading independent of any tilt of the moving assembly. The interior sides of coil holder 104, and the exterior top and sides of flux disk 306, are preferably painted to absorb infrared light so that light does not reach the phototransistor through secondary reflections. Such an embodiment provides better contrast between readings at the limits of travel.

The output of position circuit 700 is usually not linear with respect to the position of moving assembly 100. The output may be characterized as being approximately the inverse square of the distance between proximity sensor 308 and the inside surface of coil holder 104. This effect can be corrected, for example, by calibrating proximity sensor 308 prior to use. The moving assembly 100 is moved across its range of possible positions very precisely, for example, with a micrometer in steps of 0.001 inch. The output of the position circuit is then measured and recorded. Later, when a making a position measurement, the output corresponds to one of position circuits 700(1)-(N) and is compared to the stored values, and the distance is computed with an interpolation of the two closest readings. This calibration procedure also corrects for any non-linearity in the response curve of the phototransistor. Alternatively, an equation could be fit to the calibration data to allow a direct computation of the position from a reading.

XY Sensor Operation

XY sensor 116 may be of many conventional designs, such as a resistive film position sensor. The effective resolution of a resistive film position sensor is typically greater than 100 dots per inch (dpi). In the scenario in which haptel grid 604 is mapped to a display (not shown), the cumulative resolution of XY sensors 116(1)-(N) on haptel grid 604 is preferably equal to or greater than the resolution of the display area mapped to I/O device 900 (e.g., as a result of the direct mapping between haptel grid 604 and the display). However, there may be pixels on the display which cannot be touched by the user. For example, the resolution of computer displays is typically 75 to 100 dpi, thus haptel grid 604 can be mapped to an equal or somewhat larger display area when resistive film technology is used in XY sensors 116(1)-(N).

The actuation force of this type of sensor can be controlled during its manufacture. Unlike other uses for these touch sensors, the sensor is not used to initiate actions but only to sense position. Because each haptel potentially maps to multiple user interface elements, the device cannot determine which haptic effect to generate until the XY coordinates of a touch are known. Preferably, the lowest possible actuation force is thus used. For example, a value of 5 grams could be employed.

Actuation force also comes into play when touches overlap multiple haptels. Because applied force is spread across the haptels involved in the touch, it is possible that the force on one or more of the haptels is below the threshold of its XY sensor. In the worst case, a force of 20 grams would have to be applied at the vertex of 4 haptels before getting an XY reading (using a 5 gram actuation force). While users can adapt to differences in actuation force for different parts of the display, the user experience is enhanced by a more uniform and lower actuation force. An alternative is the use of sensors that exhibit a reduced actuation force, such as capacitive proximity sensors.

Actuator Operation

Integral to the design of the haptel in the preferred embodiment is actuator 504. Actuator 504 is comprised of the following subset of haptel 500 parts: magnet 304, flux disk 306, midsection 316, base 302, magnet wire 108 and coil holder 104. Magnet 304 creates and sustains a magnetic field, which is magnetically conducted upward through flux disk 306, radially outwards across the air gap between the flux disk and midsection 316, downward through the midsection, downward into base 302, and radially inwards and upwards through the base, returning to the other side of the magnet. Thus a magnetic field of high flux density is created in the air gap between the flux disk and the midsection. This air gap is occupied by magnet wire 108 and coil holder 104, which physically supports the magnet wire.

The actuator is preferably a high efficiency, high-bandwidth device. High efficiency allows relatively large forces to be generated without overheating. Preferably, such a device generates a force of about 2 N for a power consumption of under 5 W. Peak force in the preferred embodiment was selected to be large enough to adequately simulate a keypress effect. High bandwidth allows the force feedback to change quickly, improving the quality of haptic effects.

To apply a force to moving assembly 100, current is driven through magnet wire 108. The direction of the current flow determines the direction of the force. To improve efficiency, a rare earth magnet with energy density of at least about 27 million Gauss-Oersteds is preferably employed. Ferromagnetic material with a good permeability is preferably used for the flux return path to further maximize the air gap flux density. There are design tradeoffs between the air gap length, the surface area and thickness of the magnet, among other factors, which would be apparent to a practitioner skilled in the art of electromagnetic actuator design.

Each of one magnet wire 108(1)-(N) is driven by an actuator circuit 800, shown in FIG. 8. In one embodiment, a digital input bus 14 bits wide is shared by all of actuator circuits 800(1)-(N). The least significant 8 bits of the digital bus encodes the pulse width, the next 4 bits encode the haptel identifier, the next bit encodes the latch control, and the most significant bit encodes the direction of the actuation (e.g., pulling downward or pushing upward).

Comparator 805 is a 4-bit comparator. Suitable parts are available from Motorola of Schaumberg, Illinois under trade designation MC74F85. Comparator 805 continually compares the haptel identifier on the digital bus to the binary number encoded on identifier switch array 815. Identifier switch array 815 is a 4 position DIP switch. Suitable parts are available from Grayhill of La Grange, Ill. under trade designation 76SB04. Each actuator circuit has a unique setting on its identifier switches. The four bits of identification are adequate to distinguish between the nine haptels in this embodiment. Resistor network 820 keeps comparator inputs near ground when a switch is open. Suitable parts are available from Matsushita Electric of Secaucus, N.J. under trade designation EXB-F6E222G.

The latch control bit couples to the =IN input of comparator 805, and inverter 810 couples the logical negation of the latch control bit to the <IN input. When the latch control bit is high, the P=Q output of comparator 805 is high when the haptel identifier on the digital bus matches the number encoded on the identifier switches. When the latch control bit is low the P=Q output is low regardless of the haptel identifier on the digital bus. Inverter 810 is a standard NOT gate. Suitable parts are available from Motorola under trade designation MC74F04.

When the P=Q output on comparator 805 is high, the pulse width data is passed through latch 825 and the direction bit is passed through latch 830. The data should remain on the digital bus until the latch bit goes low. In this way, the pulse width and direction data remain latched, and the actuator circuit can drive the magnet wire until a new value is assigned. Latch 825 and latch 830 are 8-bit latches. Suitable parts are available from Texas Instruments of Dallas, Tex. under trade designation SN74F573.

Clock 835 is a CMOS oscillator which generates a clock signal at a high frequency, preferably at least 4 MHz. Suitable parts are available from Epson America of Torrance, Calif. under trade designation SG531P. Inverters 840 and 850 are standard NOT gates, such as the Motorola MC74F04. Inverters 840 invert the clock signal and delay the propagation of the signal. There is a brief time period during at the very beginning of each clock cycle when both inputs to AND gate 845 are high. AND gate 845 is a standard AND gate, such as the Motorola MC74F08. The output of inverter 850 is a delayed version of the original clock, due to the even number of inverters. Thus the pulse from AND gate 845 comes at the very end of the clock cycle which drives counters 855 and 860.

Counters 855 and 860 are 4-bit synchronous counters cascaded to form an 8-bit counter. Suitable parts are available from Texas Instruments under trade designation SN74F163A. This counter freely cycles from 0 to 255, driven by the delayed clock signal. Comparators 865 and 870 are 4-bit comparators cascaded to form an 8-bit comparator. Suitable parts are available from Motorola under trade designation MC74F85. The P>Q output of comparator 870 is high when the latched pulse width value is strictly greater than the current synchronous counter value. Thus the width of the P>Q pulse is proportional to the pulse width value. If the pulse width value is 0, the P>Q output is never high. If the pulse width value is 255, the P>Q output is high for 254 out of every 255 clock cycles.

The output of AND gate 845 latches the outputs of comparator 870 and latch 830 into latch 875 at the end of each clock cycle. In this way, the output of comparator 870 is guaranteed to be valid, taking into account the propagation delays in the synchronous counters and the comparators from the beginning of the clock cycle. Latch 875 is an 8-bit latch. Suitable parts are available from Texas Instruments under trade designation SN74F573.

Motor driver chip 885 uses the pulsing comparator output to enable and disable its outputs. When 1,2EN is high, the outputs are switched on and current can flow. When 1,2EN are low, the outputs are in a high-impedance state and no current flows through magnet wire 108. The direction of the current flow is determined by the 1A and 2A inputs. When 1A is high, the 1Y output is at 12 volts, and when 1A is logic low, the 1Y input is at ground. Likewise for the 2A input and 2Y output. Due to inverter 880, the 1A and 2A inputs are always logically opposite. Thus when the direction bit is high, the 1Y output is at 12 Volts and the 2Y output is at ground, causing current to flow through the magnet wire in one direction. When the direction bit is low, the 1Y output is at ground and the 2Y output is at 12 Volts, causing current to flow in the other direction. Flyback diodes 890 prevent the inductance of the magnet wire from damaging the motor driver chip when the outputs are switched off. Coil cable 114 couples actuator circuit 800 to magnet wire 108. Motor driver chip is high-current driver chip. Suitable parts are available from Texas Instruments under trade designation L293D. Flyback diodes 890 are high-current fast-recovery diodes, such as the UF 1002T made by Vishay Intertechnology of Malvern, Pa.

Actuator circuit 800 is just one way to interface a processor to an actuator. Many different circuits are possible, depending on the bandwidth and accuracy desired and the type of actuator being interfaced, among other factors. For example, a digital-to-analog converter could be used in combination with a linear amplifier to drive an electromagnetic actuator.

As a result of coil inductance, the relationship between the force generated by a given haptel and the width of the pulse generated by actuator circuit 800 may not be linear. Actuator circuits 800(1)-(N) are therefore calibrated prior to use by measuring the force actually generated by each output value, and storing that measurement. Later, when a certain output force is desired, the correct output value to use is calculated by interpolating between the closest desired output values.

Substantial energy is dissipated by magnet wires 108(1)-(N) at its peak force output. To minimize heat buildup in the haptel, coil holder 104 and surface 102 are preferably made of a material with high heat conductance. This allows heat to be conducted upward to surface 102, where the heat can radiate away. Heat also radiates to stationary assembly 300, which can be configured to act as a heat sink in combination with unified support plate 602.

Control System Operation

Figure 10:
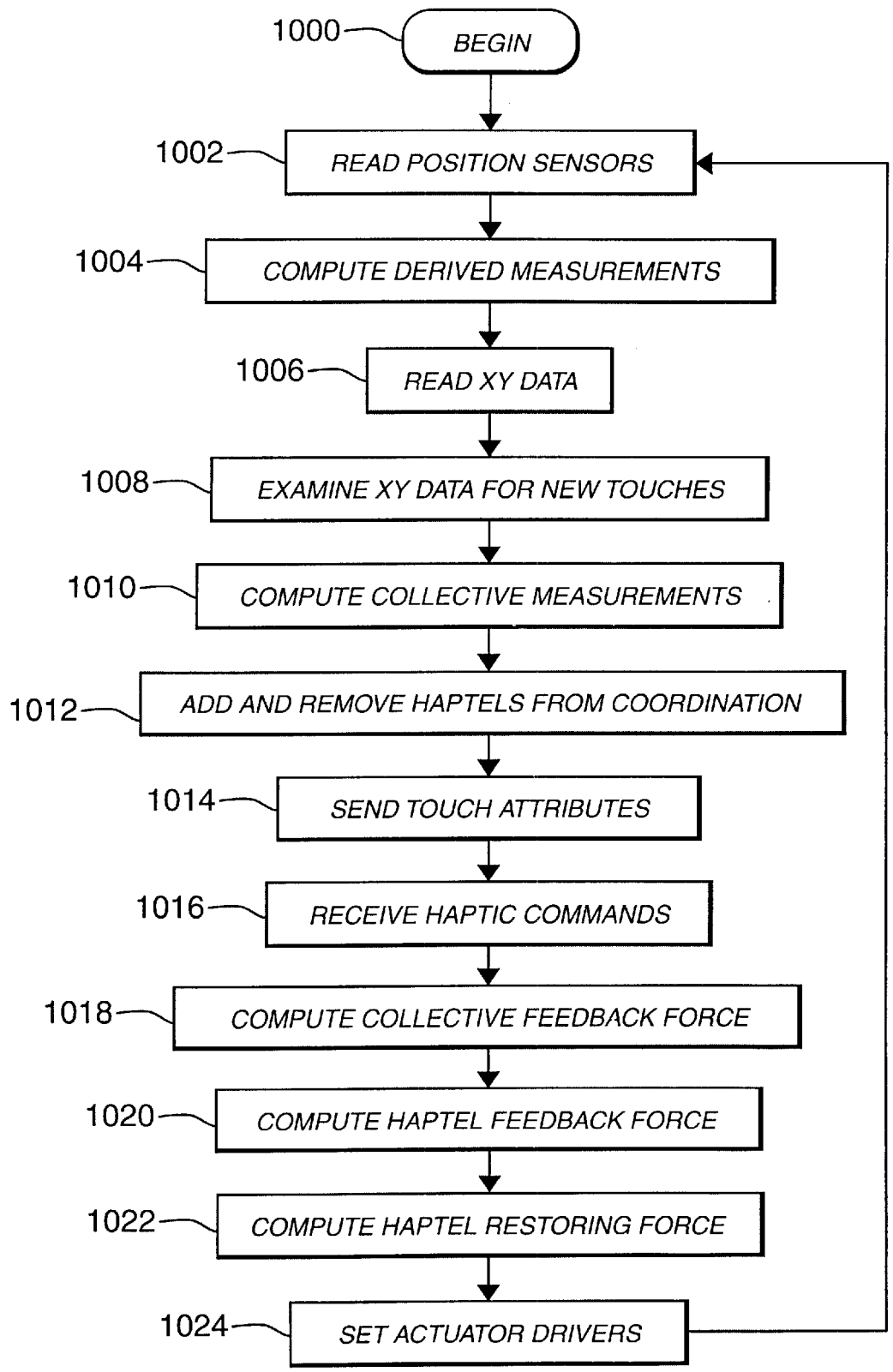
FIG. 10 is a flow chart representation of a method for controlling the apparatus.

FIG. 10 illustrates a flow diagram of the operation of I/O device 900 according to one embodiment of the present invention. The flow diagram of FIG. 10 describes the actions performed in running control system 902 (e.g., by software). The management of I/O device 900 is preferably handled as a real-time task, so a separate control processor is preferably used instead of running control software on computer 916. The control loop's frequency can be an important factor in the operation of I/O device 900. The computational performance of control processor 904, the speed of input and output operations, and the degree of optimization of the control software all affect the frequency (and thus responsiveness) attainable on a specific system. In one embodiment, a control loop frequency of 10 kHz is used.

The process begins with the reading of the haptels' position sensors (step 1002). Analog input card 906 is preferably programmed during initialization to sample all inputs cyclically (e.g., for a system with nine haptels, and so, nine inputs, this would be at an aggregate frequency of 90 kHz providing a per haptel sampling rate of 10 kHz, and thus matching the control loop frequency). The sampling rate is preferably selected to exceed the bandwidth of proximity sensors 308(1)-(N) and the maximum pass frequency of position circuits 700(1)-(N) by a factor of two. The stored calibration values are used to compute the calibrated position value of each moving assembly (e.g., in millimeters). These calibrated position values may then be stored for later use.

Derived measurements are computed for each haptel using position values (step 1004). The current velocity is computed by differentiating the position values.

The current acceleration is computed by differentiating velocity values. In both cases, the result is low-pass filtered in order to reduce noise. The net force acting on moving assembly 100 is computed by dividing the acceleration of moving assembly 100 by the mass of moving assembly 100. The force applied to XY sensor 116, referred to herein as the applied force, is the result of subtracting the actuator force, the spring force and the weight of the moving assembly from the net force. The actuator force is known because the control computer sets the actuator force, the spring force is computed from the spring constant and the current position of moving assembly 100, and the weight of the moving assembly was measured prior to assembly. Thus, the velocity, acceleration and applied force for each haptel can be computed from position measurements. Although derived measurements may have more noise, higher latency and less bandwidth than the original position measurements, such measurements are still adequate to allow implementation of the methods described herein.

Next, control processor 904 reads XY data from serial ports (step 1006). XY interfaces 912(1)-(N) send updated XY position values relatively infrequently when compared to the relatively high frequency at which the control loop runs, and so there is normally no data waiting. If data is waiting, control processor 904 reads the updated value and stores that value in memory. The value either encodes the location of a touch, or encodes that there is no touch applied to the sensor. The XY values are converted to a universal coordinate system using the position of the haptel within the haptel grid to offset the haptel's XY sensor reading.

Control processor 904 examines the incoming XY data for new touches (step 1008). If a touch has appeared on a haptel since the last data point, three cases are possible. If this haptel is already part of a coordinated touch, no action is taken. If the haptel is not currently part of a coordinated touch, control processor 904 determines if a touch recently appeared within a predetermined distance of the haptel and within a predetermined time period. If such a touch is found, then this touch is presumed to be part of the same touch, and this haptel is added to the coordinated touch. If no such touch is found, then a new coordinated touch is started with this haptel as the only member.

Control processor 904 updates the collective measures for all coordinated touches (step 1010). For each coordinated touch, the collective position is computed as an average of the vertical position values for each haptel belonging to the touch, preferably with each value weighted by the applied force for that haptel, as derived earlier (step 1004). Thus haptels with no applied force do not contribute to the collective position measurement. Other weightings are possible, including equal weighting. Likewise, the collective velocity and collective acceleration are computed as a weighted average of these values for the haptels that constitute the coordinated touch. The collective XY location of the touch is also preferably a weighted average of the constituent XY readings. The collective applied force is a total of the applied force for all the haptels involved in the coordinated touch.

The collective XY measurements for a coordinated touch are evaluated (step 1012) to determine if haptels need to be added to, or removed from the coordinated touch. If the collective XY of a touch is less than a first predetermined distance of from a nearby haptel, that haptel is added to the coordinated touch, if the haptel is not already a member of another coordinated touch. If the collective XY of a touch is greater than a second predetermined distance from a haptel already a part of the coordinated touch, that haptel is removed from the coordinated touch. The second predetermined distance is preferably greater than the first predetermined distance, and the difference between these two values is preferably large enough to prevent a given haptel from being quickly added to and removed from a touch if the given haptel's distance from the touch is close to these values. The first and second predetermined distances should be large enough that the haptels being added and removed are not currently being touched. In one embodiment, a value greater than half the size of the intended touching object, such as the fingertip, is often adequate.

The current state of coordinated touches is periodically sent to computer 916 over serial link 914 (step 1014). Computer 916 is preferably updated with a frequency on the order of hundreds of times per second. Computer 916 is preferably sent only the collective measurements of XY, position, velocity, acceleration and applied force. Serial link 914 is preferably checked for incoming data from computer 916 containing instructions on the haptic effects to use for each coordinated touch (step 1016). Typically, haptic effect commands are sent after a new coordinated touch starts, and only periodically once the touch is in progress. The haptic effect might be changed subsequently depending on the state of the software executed by computer 916. For example, after a user has started to press a virtual button, computer 916 can disable the button. The new haptic effect is preferably implemented as soon as it is received. Haptic effect command can be designated to simply assign one of many built-in haptic effects to the coordinated touch or to define a custom haptic effect (e.g., by mixing together built-in effects, transmitting a force response curve, or downloading executable machine codes which implement an effect).

The collective feedback force for each coordinated touch is then computed based on the collective measurements derived earlier using the haptic effect command sent from the computer (step 1018). For a simple "button" response, for example, the feedback force can be primarily computed based on the collective position. At 0.0 mm travel the force is about 0.05 Newton, which increases linearly to 0.75 Newton over the next 0.3 mm of travel, then decreases to 0.10 Newton over the next 0.5 mm travel, and finally increases to 2.0 Newtons over the next 1.0 mm of travel, and stays at 2.0 Newtons over the remainder of travel. For a simple "disabled button" response, for example, the feedback force is 0.05 Newton at 0.0 mm of travel, increasing linearly to 2.0 Newtons over the next 0.6 mm of travel, and staying at 2.0 Newtons over the remainder of the travel. These are just two examples of haptic effects, a multitude of which are possible.

The feedback force for each haptel is computed by distributing the collective feedback force across all of the haptels in the coordinated touch in proportion to the amount of the applied force on each haptel (step 1020). If the applied force of a given haptel is, for example, half of the total applied force for the collective touch, then the feedback force for that haptel will be half of the collective feedback force. Different haptels in the same coordinated touch can have different feedback force values, because they each have different applied forces, but the total of these forces will equal the feedback force for the collective touch.

The restoring force for each haptel is computed based on each haptel's distance from the collective position (step 1022). Due to errors in measurements and other effects, the surfaces of the haptels in a coordinated touch can drift apart vertically. Thus a restoring force is applied which pulls each haptel in a coordinated touch back towards the collective position, proportional to its distance from that position. The restoring force is preferably greater than 2.0 Newtons per millimeter. The upper limit for this value depends on the control loop frequency and the resolution of the position measurement, among other factors. Since the haptel positions are distributed around the collective position, this restoring force does not add noticeable net force to the coordinated haptic effect. Additionally, damping can be added in proportion to the relative velocity of a haptel compared to the collective velocity. This prevents haptels from oscillating around the average position.

The net force for each haptel is computed, then converted to the correct actuator circuit output value and set via the digital output card (step 1024). The net force for each haptel is simply the sum of that haptel's desired feedback force and that haptel's restoring force. The actuator force is computed by subtracting the effect of the spring at the current position and the weight of the moving assembly from the net force. The actuator force is converted to the correct output value using the calibration table recorded previously. The actuator circuits can be programmed by writing the output value to digital output card 908 by, for example, first writing out the data values, and then raising and lowering the latch bit to latch in the new data. After the actuators are set, the flow of control returns to step 1002. The program loops indefinitely while haptic responses are being generated.

The operations referred to in FIG. 10 and elsewhere herein may be modules or portions of modules (e.g., software, firmware or hardware modules). For example, although the described embodiment includes software modules and/or manually entered user commands, the various exemplary modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule. Furthermore, those skilled in the art will recognize that the operations described in exemplary embodiment are for illustration only. Operations may be combined or the functionality of the operations may be distributed in additional operations in accordance with the invention.

Thus, an I/O device such as that described herein provides a natural way of interacting with a computer by employing direct mapping that provides for multiple simultaneous inputs and dynamic haptic feedback, in order to enhance a user's interactive experience.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Moreover, while the invention has been particularly shown and described with reference to these specific embodiments, it will be understood by those skilled in the art that the foregoing and other changes in the form and details may be made therein without departing from the spirit or scope of the invention. For example, there can be an arbitrary number of haptels in the grid. The touchable surface can be divided into multiple distinct areas whose tilt and orientation is varied relative to each other or fixed by the design. Moreover, the individual haptels need not be flat, so long as the surfaces of neighboring haptels form a continuous surface when tiled together. For example, the haptel surfaces can each have a three-dimensional quality (e.g., a slight spherical curve). Such haptels could thus be tiled such that the touchable area forms a section of a sphere, ellipsoid, or other three-dimensional surface. The proximity sensor can be replaced by a linear optical encoder or other type of position sensor. Position measurement can be derived from other sensors, such as by integrating the signal from a velocity sensor. Multiple sensors of different types can be combined, such as a position sensor and an accelerometer, for example. A force sensor can be added to the design, such as a piezoelectric sensor, or other type of force sensor. The spring can be removed and the actuator powered to provide an upward force adequate to keep the haptel at its upper travel limit (or some other position) when no force is applied. The actuator can be replaced with another type of actuator, such as a moving magnet actuator. Alternative bearing designs may also be used (e.g., other types or combinations of bearing materials, or rolling bearing designs, among other possibilities). The haptels can be coordinated in other ways, such as making the feedback force for one haptel or set of haptels equal to the applied force of a different haptel or set of haptels, and vice versa. The touch location sensor can be replaced by another type of sensor, such as a capacitive proximity sensor. The grid of haptels can be covered by a single, flexible touch location sensor, or by multiple, possibly overlapping, flexible touch position sensors. Each haptel could contain multiple touch location sensors, so that more than one touch could be distinguished within the bounds of each haptel. The functionality of the control processor can be implemented by the computer.

Accordingly, the scope of the invention should be determined not by any of the embodiments illustrated, but with reference to the appended claims and their legal equivalents.

What is claimed is:

1. An input/output device comprising:
   a plurality of haptic elements, wherein
      each one of said plurality of haptic elements comprises a contact surface,
      said contact surfaces define a surface, and
      each haptic element of said plurality of haptic elements is configured to provide a haptic effect at the contact surface of said each haptic element upon said contact surface of said each haptic element being touched;
   a plurality of sensors, each one of said plurality of sensors coupled to the contact surface of a corresponding one of said plurality of haptic elements, wherein said sensor is a one of said plurality of sensors, wherein each one of said sensor is configured to generate information in response to said contact surface being touched and each of said plurality of haptic elements is configured to produce said haptic effect based on said information; and
   a processor, coupled to said plurality of sensors and said plurality of haptic elements, wherein
      said processor is configured to control a haptic effect produced by certain ones of said plurality of haptic elements based on information received from ones of said plurality of sensors corresponding to said certain ones of said plurality of haptic elements,
      said certain ones of said plurality of haptic elements are ones of said plurality of haptic elements being touched, and
      said processor is configured to cause contiguous haptic elements of said certain ones of said plurality of haptic elements to collectively produce a haptic effect by virtue of being configured to calculate a weighted average of a force experienced by each one of said contiguous haptic elements.

2. An input/output device comprising:
   a plurality of haptic elements, wherein
      each one of said plurality of haptic elements comprises a contact surface,
      said contact surfaces define a surface, and
      at least one of said plurality of haptic elements is configured to produce a haptic effect at a contact surface of said at least one of said plurality of haptic elements; and
   a sensor, wherein
      said sensor is coupled to said contact surface of said at least one of said plurality of haptic elements,
      said sensor is configured to generate information in response to said contact surface being touched,
      said at least one of said plurality of haptic elements is configured to produce said haptic effect based on said information,
      certain ones of said plurality of haptic elements are configured to produced a haptic response at a respective contact surface of said certain ones of said plurality of haptic elements in response to said respective contact surface of said certain ones of said plurality of haptic elements being touched,
      said certain ones of said plurality of haptic elements produce a given haptic effect in a cooperative manner by summing forces on ones of said certain ones of said plurality of haptic elements being touched, taking a weighted average of positions of said ones of said certain ones of said plurality of haptic elements being touched, and combining this information in order to determine a desired feedback force for each one of said ones of said certain ones of said plurality of haptic elements being touched.

3. An input/output device comprising:
a plurality of haptic elements, wherein
each one of said plurality of haptic elements comprises a contact surface,
said contact surfaces define a surface,
each haptic element of said plurality of haptic elements is configured to provide a haptic effect at a contact surface of said haptic element upon said contact surface of said haptic element being touched;
a plurality of sensors, each one of said plurality of sensors coupled to a contact
surface of a corresponding one of said plurality of haptic elements; and
a processor, coupled to said plurality of sensors and said plurality of haptic elements, wherein
each one of said plurality of sensors is configured to generate information upon said contact surface of said corresponding one of said plurality of haptic elements being touched,
said processor is configured to control a haptic effect provided by certain ones of said plurality of haptic elements based on information received from ones of said plurality of sensors corresponding to said certain ones of said plurality of haptic elements,
said certain ones of said plurality of haptic elements are ones of said plurality of haptic elements being touched, and
said processor is configured to cause said contiguous haptic elements to collectively produce a haptic effect by virtue of being configured to calculate a weighted average of a force experienced by each one of said contiguous haptic elements.

4. An input/output device comprising:
a plurality of haptic elements, wherein
each one of said plurality of haptic elements comprises a contact surface,
said contact surfaces define a surface,
certain ones of said plurality of haptic elements are configured to produce a haptic effect at a respective contact surface of said certain ones of said plurality of haptic elements in response to said respective contact surface of said certain ones of said plurality of haptic elements being touched, and
said certain ones of said plurality of haptic elements provide said haptic effect in a cooperative manner by
summing forces on ones of said certain ones of said plurality of haptic elements being touched,
taking a weighted average of positions of said ones of said certain ones of said plurality of haptic elements being touched, and
combining this information in order to determine a desired feedback force for each one of said ones of said certain ones of said plurality of haptic elements being touched.

5. An input/output device comprising:
a plurality of haptic elements, wherein
each one of said plurality of haptic elements comprises a contact surface,
said contact surfaces define a surface, and
at least one of said plurality of haptic elements is configured to produce a haptic effect at a contact surface of said at least one of said plurality of haptic elements;
a sensor, wherein
said sensor is coupled to said contact surface of said at least one of said plurality of haptic elements,
said sensor is configured to generate information in response to said contact surface being touched, and
said at least one of said plurality of haptic elements is configured to produce said haptic effect based on said information; and
a processor, coupled to said sensor and said at least one of said plurality of haptic elements, wherein
said processor is configured to control said haptic effect produced by said at least one of said plurality of haptic elements based on information received from said sensor, and
said sensor is configured to act as said contact surface.

6. An input/output device comprising:
a plurality of haptic elements, wherein
each one of said plurality of haptic elements comprises a contact surface,
said contact surfaces define a surface, and
at least one of said plurality of haptic elements is configured to produce a haptic effect at a contact surface of said at least one of said plurality of haptic elements;
a sensor, wherein
said sensor is coupled to said contact surface of said at least one of said plurality of haptic elements,
said sensor is configured to generate information in response to said contact surface being touched, and
said at least one of said plurality of haptic elements is configured to produce said haptic effect based on said information; and
a processor, coupled to said sensor and said at least one of said plurality of haptic elements, wherein
said processor is configured to control said haptic effect produced by said at least one of said plurality of haptic elements based on information received from said sensor, and
said sensor is a touch sensor.

7. An input/output device comprising:
a plurality of haptic elements, wherein
each one of said plurality of haptic elements comprises a contact surface,
said contact surfaces define a surface, and
at least one of said plurality of haptic elements is configured to produce a haptic effect at a contact surface of said at least one of said plurality of haptic elements;
a sensor, wherein
said sensor is coupled to said contact surface of said at least one of said plurality of haptic elements,
said sensor is configured to generate information in response to said contact surface being touched, and
said at least one of said plurality of haptic elements is configured to produce said haptic effect based on said information; and
a processor, coupled to said sensor and said at least one of said plurality of haptic elements, wherein
said processor is configured to control said haptic effect produced by said at least one of said plurality of haptic elements based on information received from said sensor, and
said sensor is a position sensor.

8. An input/output device comprising:
a plurality of haptic elements, wherein each one of said plurality of haptic elements comprises a contact surface,
said contact surfaces define a surface, and
at least one of said plurality of haptic elements is configured to produce a haptic effect at a contact surface of said at least one of said plurality of haptic elements;
a sensor, wherein
said sensor is coupled to said contact surface of said at least one of said plurality of haptic elements,
said sensor is configured to generate information in response to said contact surface being touched, and
said at least one of said plurality of haptic elements is configured to produce said haptic effect based on said information; and
a processor, coupled to said sensor and said at least one of said plurality of haptic elements, wherein
said processor is configured to control said haptic effect produced by said at least one of said plurality of haptic elements based on information received from said sensor, and
said sensor is a motion sensor.

9. A computer system comprising:
a first processor;
a display, coupled to said first processor;
an input/output device, coupled to said first processor and comprising a plurality of haptic elements, wherein
each one of said plurality of haptic elements comprises a contact surface,
said contact surfaces define a surface, and
at least one of said plurality of haptic elements is configured to produce a haptic effect at a contact surface of said at least one of said plurality of haptic elements; and
a sensor, wherein
said sensor is coupled to said contact surface of said at least one of said plurality of haptic elements,
said sensor is configured to generate information in response to said contact surface being touched,
said at least one of said plurality of haptic elements is configured to produce said haptic effect based on said information, and
said sensor is configured to act as said contact surface.

10. A computer system comprising:
a first processor;
a display, coupled to said first processor;
an input/output device, coupled to said first processor and comprising a plurality of haptic elements, wherein
each one of said plurality of haptic elements comprises a contact surface,
said contact surfaces define a surface, and
at least one of said plurality of haptic elements is configured to produce a haptic effect at a contact surface of said at least one of said plurality of haptic elements;
a sensor, wherein
said sensor is coupled to said contact surface of said at least one of said plurality of haptic elements,
said sensor is configured to generate information in response to said contact surface being touched,
said at least one of said plurality of haptic elements is configured to produce said haptic effect based on said information; and
a second processor, coupled to said sensor and said at least one of said plurality of haptic elements, wherein
said second processor is configured to control said haptic effect produced by said at least one of said plurality of haptic elements based on information received from said sensor, and
said sensor is a touch sensor.

11. A computer system comprising:
a first processor;
a display, coupled to said first processor;
an input/output device, coupled to said first processor and comprising a plurality of haptic elements, wherein
each one of said plurality of haptic elements comprises a contact surface,
said contact surfaces define a surface, and
at least one of said plurality of haptic elements is configured to produce a haptic effect at a contact surface of said at least one of said plurality of haptic elements;
a sensor, wherein
said sensor is coupled to said contact surface of said at least one of said plurality of haptic elements,
said sensor is configured to generate information in response to said contact surface being touched,
said at least one of said plurality of haptic elements is configured to produce said haptic effect based on said information; and
a second processor, coupled to said sensor and said at least one of said plurality of haptic elements, wherein
said second processor is configured to control said haptic effect produced by said at least one of said plurality of haptic elements based on information received from said sensor, and
said sensor is a position sensor.

12. A computer system comprising:
a first processor;
a display, coupled to said first processor;
an input/output device, coupled to said first processor and comprising a plurality of haptic elements, wherein
each one of said plurality of haptic elements comprises a contact surface,
said contact surfaces define a surface, and
at least one of said plurality of haptic elements is configured to produce a haptic effect at a contact surface of said at least one of said plurality of haptic elements;
a sensor, wherein
said sensor is coupled to said contact surface of said at least one of said plurality of haptic elements,
said sensor is configured to generate information in response to said contact surface being touched,
said at least one of said plurality of haptic elements is configured to produce said haptic effect based on said information; and
a second processor, coupled to said sensor and said at least one of said plurality of haptic elements, wherein
said second processor is configured to control said haptic effect produced by said at least one of said plurality of haptic elements based on information received from said sensor, and
said sensor is a motion sensor.

* * * * *